United States Patent Office 2,814,507
Patented Nov. 26, 1957

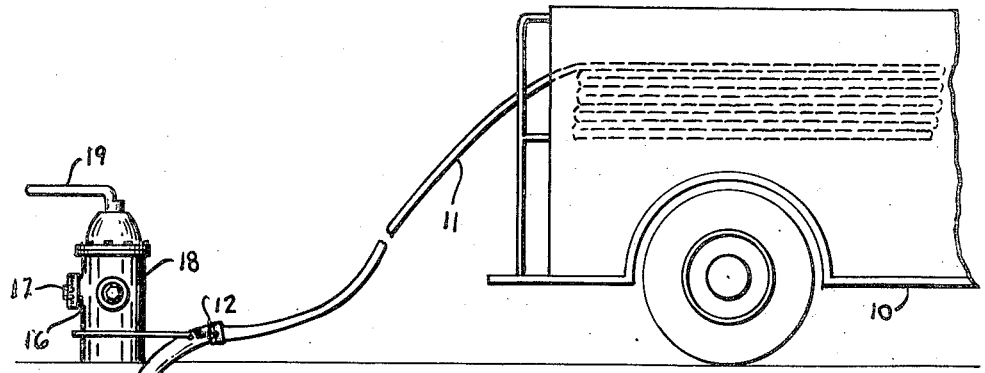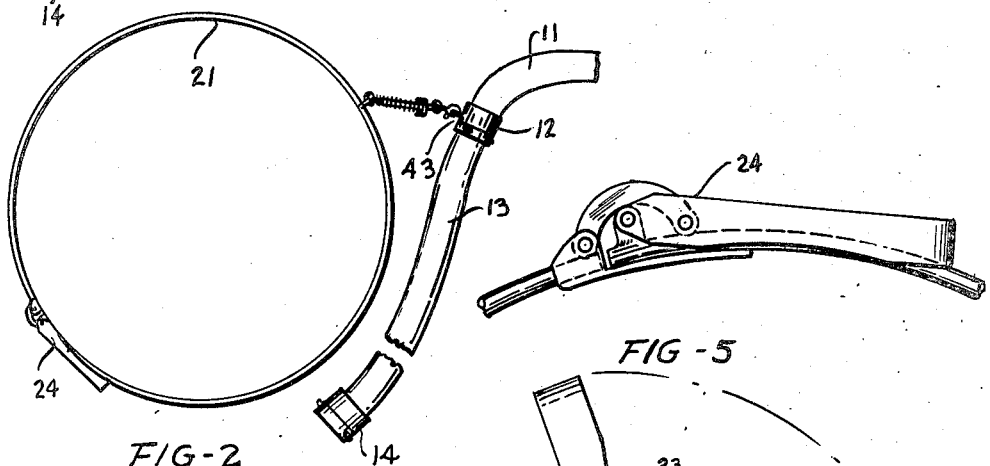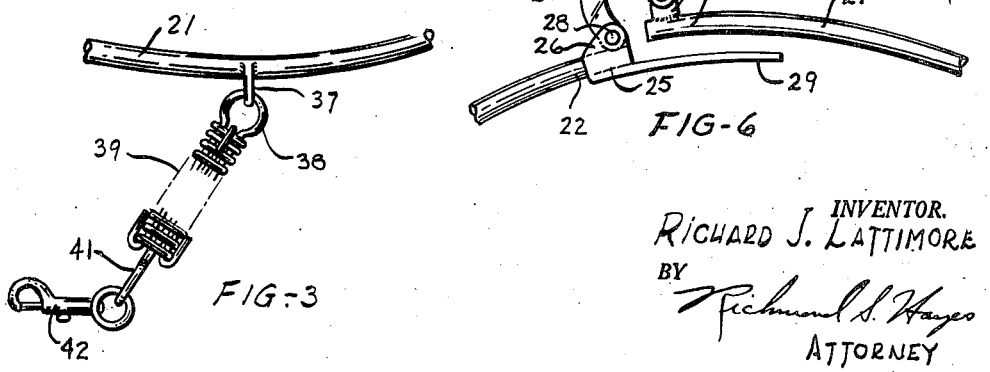

2,814,507

TEMPORARY ANCHOR FOR FIRE HOSE

Richard J. Lattimore, Lakewood, N. Y.

Application August 20, 1954, Serial No. 451,108

1 Claim. (Cl. 285—23)

This invention relates to structure for anchoring one end of a fire hose to a hydrant or other fixed member during laying a line of hose between a source of water supply and the place of a fire.

Heretofore, when a hose truck has come to a source of water supply, such as a fire hydrant, two or more men have had to jump from the truck, grasp the free end of the hose and wrap it around the hydrant or some other suitable member for anchorage. The truck could then move toward the place of a fire with the hose paying out from its previously folded or packed condition in the truck. Some such anchorage is necessary, as the movement of the truck and consequent pull on the hose would be too great for several men to hold. On occasion, regardless of how carefully a hose has been packed in a truck, it may become twisted or snarled during the paying out operation, or a coupling between sections may be caught on some portion of the truck. In such circumstances, the hose comes under considerable tension and the pull thereon tends to unwrap the hose from the hydrant with such force that the end coupling is known to have seriously injured the men holding it. The tensile strength of the fire hose is such that a momentary snagging or snarling thereof, as it leaves the truck, will not fracture the hose but, nevertheless, apply sufficient force to the end wrapped around the hydrant to endanger men holding such end.

Additionally, it is pointed out that very frequently several hundred feet of hose must be laid between the source of water supply and the place of a fire. Since the operation of laying the hose is necessarily somewhat slow, several minutes may lapse to complete this operation. Of course, during this operation, the men anchoring the hose can do nothing about coupling it to the hydrant or connecting it with any other source of water supply, and must, therefore, wait to carry out this operation until the entire length of hose has been laid. It is well known that the promptness with which water can be applied to a fire is of great importance and that any saving in seconds or minutes that can be effected in laying and coupling a hose line may result in preventing fire loss of valuable property.

The present invention is therefore directed to and has for its principal object the provision of a safe, temporary anchor for the end of a fire hose at the source of water supply during the operation of paying out hose from a hose carrying truck.

Another object of the invention lies in the provision of a fire hose having its end provided with a hydrant anchor ring which may be manipulated through the efforts of only one person.

A further object of the invention lies in the provision of means for anchoring the end of a fire hose to a hydrant or other upright member in such manner as to enable coupling or connecting the hose with the source of water supply during the time the hose is being laid to the place of a fire.

Other and further objects and advantages of the invention will be more fully understood from a consideration of the following specification, taken in conjunction with the accompanying drawing, in which Fig. 1 is a fragmentary side elevational view showing the invention applied to a hydrant and serving to anchor the free end of a hose thereto during the operation of laying a hose to the place of a fire;

Fig. 2 is a top plan view of the anchor and the connection with an end portion of the hose;

Fig. 3 is an enlarged fragmentary view showing details of the yieldable connector between the ring anchor and a hose coupling;

Fig. 4 is an enlarged fragmentary edgewise view of a relief fastener for the anchor ring;

Fig. 5 is a side elevational view of the structure shown in Fig. 4; and

Fig. 6 is a view similar to Fig. 5, showing the position of the operative parts when the fastener is released.

Referring more particularly to the drawing, the reference numeral 10 is employed to generally designate the rear portion of a hose carrying fire truck. All such trucks are open at their rear ends and the hose, in flat condition, is laid in folds in order that it may be readily withdrawn from the truck. In the present illustration of the invention, the hose 11 is shown extending beyond the end of the truck and is fitted with a conventional coupling 12, from which extends a short section 13. The other end of this short section is provided, in the present instance, with a coupling 14 that is engageable with the threads of an outlet 16 when the cap 17 of such outlet is removed. This outlet is shown as one of several to be found on any conventional fire hydrant 18. The usual wrench 19 is shown in position of use on the hydrant and is operable to turn the water valve to allow water to pass from the outlet 16.

The anchor itself takes the form of a ring 21 that has terminals 22 and 23 which are connected by a relief fastener 24. Attached to terminal 22 is a bracket 25, having wings 26 with which one end of an arched bar 27 is pivotally engaged at 28. The base of the bracket forms a slightly offset extension 29 of the terminal 22 and, being grooved or curved in cross section, provides a rest or seat for the terminal 23. Integral with the terminal 23 is a lug 31 which rests between the ends 32 of a U-shaped hand lever 33. The ends 32 are pivotally connected with the lug by a pin 34. The other end of the bar 27 projects between the sides of the lever 33 and is pivotally joined thereto by a pin 36 at a point fairly close to the pin 34. This structure enables slightly enlarging the diameter of the ring and is considered as a means for relieving any pressure of the ring against the hydrant that may occur during laying a length of hose. Further explanation of this relief fastener for the ring will be set out in a description of the operation of the structure.

Preferably directly opposite the relief fastener 24, the ring 21 mounts an eyelet 37. One looped end 38 of a spring expansion unit 39 is engaged with the eyelet 37. From the other end of the spring unit extends a rod 41 which is joined to the ring end of a snap fastener 42. The coupling 12 that connects the main body of the hose 11 with the short section 13, is provided with an offset ring 43, with which the snap fastener 42 may be engaged. Although the part 12 has been designated as a coupling by which to join an end of the main section of a hose to a short hose section, it is obvious that this coupling could take the form of a metal band or ring clamped to the main hose and accomplish the same purpose; namely, that of providing a short section beyond connection of the hose with the anchor ring 21.

To more fully understand the advantages of the present invention, a brief description of the procedure employed in laying a hose is set out. When a fire call is received at a station, the truck carrying the hose is driven to the nearest known source of water supply, such, for example, as the hydrant 18 shown in the drawing. The truck is slowed sufficiently at the hydrant to enable one person to drop off, carrying the anchor ring 21, which he immediately throws over the hydrant. Speed of the truck may now pick up and the hose, due to the anchor ring, will pay out from the compartment in which it has been folded. During this operation of laying the hose, the person at the hydrant utilizes his time in removing the plug 17 and connecting the coupling 14 therewith. The wrench is then placed on the head of the hydrant and the operator is ready to provide water instantly the hose laying operation is completed. Had the end 13 of the hose been merely wrapped around the hydrant for anchorage and held by two or more persons, as has heretofore been customary, it would have been necessary to await the complete operation of laying the hose before the coupling 14 could be joined to the hydrant and, as already mentioned, the pull of the hose, during the laying operation, requires the force of two or more persons to provide anchorage at the hydrant. During the withdrawal of the folds of hose from the truck, any twisting or snagging thereof, if only momentary, would not damage the hose due to the relief provided by the spring unit 39. However, should the hose become permanently snagged in the truck, it is of such tensile strength that the ring 21 would break prior to any damage to the hose. When the required length of hose has been laid and water has been supplied at the place of a fire, it is desirable to relieve any lengthwise tension on the hose created by the laying operation. This may be accomplished by moving the lever 33 of the relief fastener 24 from the position of Fig. 5 to and beyond the position of the parts shown in Fig. 6. This relief of pull on the ring enables the person in attendance at the hydrant to withdraw the ring from the hydrant and unfasten it from the coupling 12. Thus, when the fire has been put out, the hose can be again folded into the truck and in preparation for a subsequent call, the fastener 42 may be again snapped onto the coupling 12.

Although applicant has shown and described only one form of a temporary anchor for a fire hose at a source of water supply, it will be evident that variations in the ring structure, ring expander, and hose connector, may be made without in any way departing from the spirit and scope of the invention insofar as such variations are covered by the annexed claim.

Having thus set forth my invention, what I claim as new and for which I desire protection by Letters Patent is:

A structure for anchoring one end of a fire hose to a fixed upright at a source of water supply during a hose laying operation from a hose carrying truck having a short section of hose, coupling parts on one end of said section of hose and the corresponding end of a main hose carried by said truck, an eye member integral with one of said coupling parts, said structure comprising an open-ended ring of a diameter to loosely encircle said upright, adjacent ends of said ring being joined by an extensible connection, parts of said connection being manually operable to increase the diameter of said ring, and a spring expandable connector joining said ring and said eye, whereby said short section is freely manipulatable to be connected with a source of water supply during a hose laying operation and upon extension of said connection the diameter of said ring being increased to relieve tension on said main hose.

References Cited in the file of this patent
UNITED STATES PATENTS

| | | |
|---|---|---|
| 790,874 | Donovan | May 23, 1905 |
| 1,514,544 | Lang | Nov. 4, 1924 |
| 1,752,193 | O'Hanlon | Mar. 25, 1930 |
| 2,236,302 | Scott | Mar. 25, 1941 |